M. J. Allen.
Mashing.
N⁰ 89,374. Patented Apr. 27, 1869.
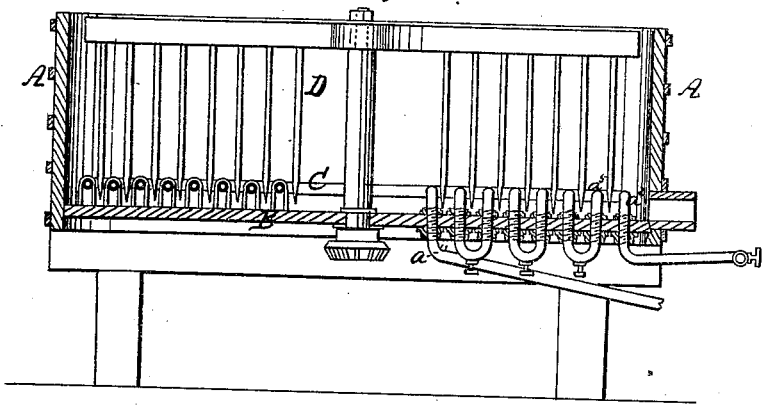
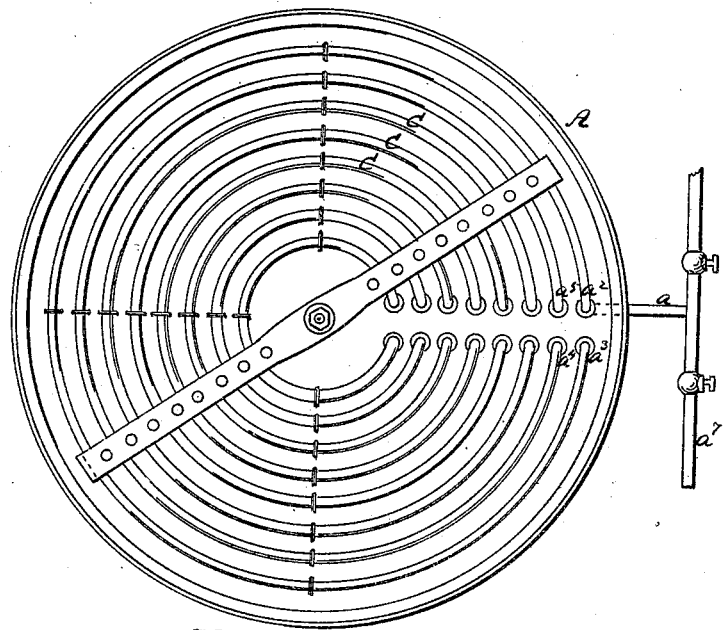
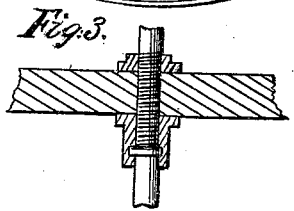
Witnesses.
John K. Books
Geo. N. Mabee
Inventor
M. J. Allen
per Munn & C
Attorneys.

MARSHALL J. ALLEN, OF NEW YORK, N. Y.

Letters Patent No. 89,374, dated April 27, 1869.

---

IMPROVED HEATING AND COOLING-COIL FOR MASH-TUBS.

---

The Schedule referred to in these Letters Patent and making part of the same.

---

*To all whom it may concern:*

Be it known that I, MARSHALL J. ALLEN, of New York, in the county of New York, and State of New York, have invented new and improved Heating and Cooling-Coils for Mash-Tubs; and I do hereby declare that the following is a full, clear, and exact description thereof, which will enable others skilled in the art to make and use the same, reference being had to the accompanying drawings, forming part of this specification.

The object of my invention is to provide an improved arrangement for heating and cooling the contents of mash-tubs, such as are used in distilleries and breweries.

My invention consists in the arrangement of a series of concentric rings of pipe at the bottom of the tub, in such a manner that the teeth of a revolving rake-head may pass between them, as will be hereinafter more fully described.

On reference to the accompanying drawings—

Figure 1 represents a sectional elevation of my improvement.

Figure 2 is a plan view of the same.

Figure 3 is a detail, showing the manner of arranging the pipes.

Similar letters of reference indicate corresponding parts.

A represents the curb of the tub, and

B, the bottom.

C represents the coil.

$a$ represents the steam-supply pipe, which is conducted under the bottom of the tub, and turned upward through it at $a^1$, and provided with a suitable packing-joint. From the upper side, at $a^2$, it is conveyed around the tub to the point $a^3$, where it is passed down through the bottom, and up again at $a^4$, from whence it is conveyed back, around to the point $a^5$, forming the second coil; thence, down through the bottom, and up again, as before, and continuing on, in this manner, until the whole bottom is sufficiently covered, and terminating in the discharge-pipe, at $a^6$.

Through this coil the steam is circulated, under sufficient pressure to heat the mash until the same is accomplished, when the steam is shut off, and a cold-water pipe, $a^7$, also communicating with the coil, through the pipe $a$, is opened, and the cold water allowed to flow through in the same manner, for cooling the mash. Each connecting-joint of the coils under the floor may be provided with water-cocks, to draw off the water, to prevent freezing.

It will be seen, that by this arrangement of the coil, the teeth of the rake or comb are permitted to work snugly between the coils, and close to the floor, whereby the whole mass is thoroughly stirred.

That portion of the pipe under or not inside of the tub may be of iron, or any other suitable metal; but it is requisite that the portion exposed to the mash be made of copper or brass, or other similar metal.

By means of the coil arranged in, as herein specified, I am enabled to scald the mash, and cool it down again, in little more than half the time usually employed, as I have demonstrated by actual experiment.

Having thus described my invention,

I claim as new, and desire to secure by Letters Patent—

The concentric rings C C, formed in the manner described, by means of the pipe $a^1$ passing successively through the bottom B of the tub, a water-cock being provided at each bend or joint thereof, all arranged so that the ends of the teeth $i$ of the rake-head D may work between them for the purpose indicated.

M. J. ALLEN.

Witnesses:
 FRANK BLOCKLEY,
 E. GREENE COLLINS.